July 10, 1962     L. D. TROJANEK     3,043,036
SNOW PLOW ATTACHMENT FOR ROTARY POWER MOWERS
Filed June 23, 1960     2 Sheets-Sheet 1

Leo D. Trojanek
INVENTOR.

BY *Clarence A. O'Brien*
*and Harvey B. Jacobson*
Attorneys

July 10, 1962 L. D. TROJANEK 3,043,036
SNOW PLOW ATTACHMENT FOR ROTARY POWER MOWERS
Filed June 23, 1960 2 Sheets-Sheet 2

Leo D. Trojanek
INVENTOR.

BY
Attorneys

United States Patent Office 3,043,036
Patented July 10, 1962

3,043,036
SNOW PLOW ATTACHMENT FOR ROTARY
POWER MOWERS
Leo D. Trojanek, 213 E. Pine, Cadillac, Mich.
Filed June 23, 1960, Ser. No. 38,170
6 Claims. (Cl. 37—195)

This invention relates to new and useful improvements in snow plows and has for its primary object to provide, in a manner as hereinafter set forth, novel means whereby conventional rotary power lawn mowers may be expeditiously converted for snow removal.

Another very important object of the present invention is to provide a snow plow attachment of the character described which may be readily mounted for use on the usual housing of a rotary power mower without altering the same structurally in any manner.

Other objects of the invention are to provide a snow plow attachment of the character set forth which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
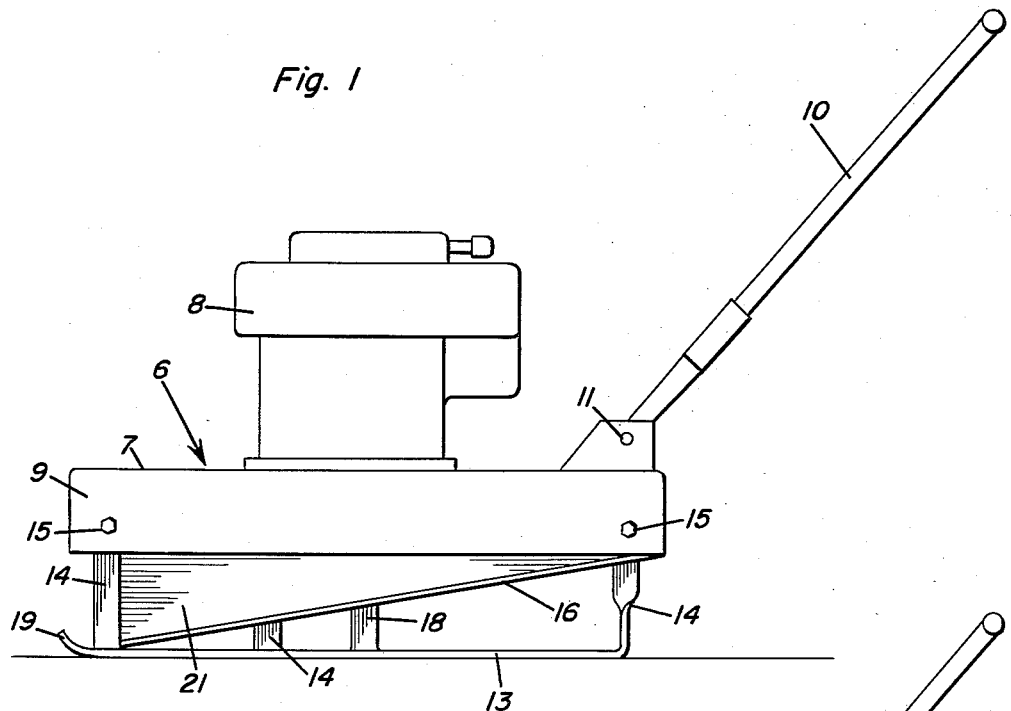
FIGURE 1 is a view in side elevation of a snow plow attachment constructed in accordance with the present invention, showing the device mounted on a rotary mower.
Figure 2:
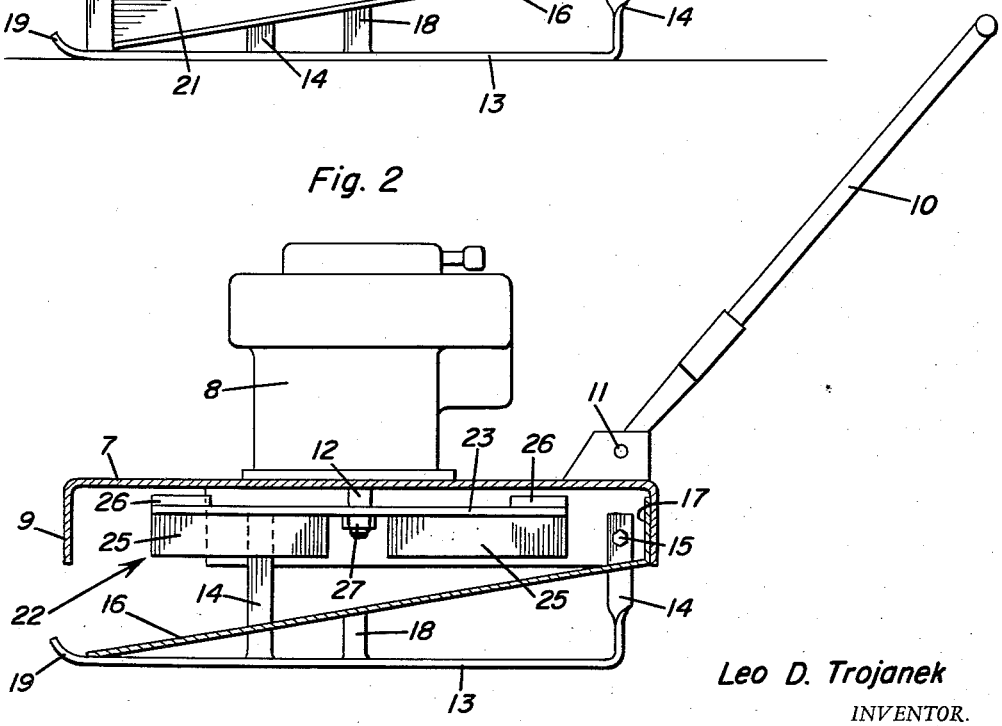
FIGURE 2 is a view in vertical longitudinal section therethrough.

Referring now to the drawings in detail, it will be seen that the reference character 6 designates generally a conventional rotary power lawn mower from which the wheels and blade have been removed. The mower 6 includes the usual housing 7 on which a motor 8 is mounted, said housing comprising a depending marginal skirt or flange 9. As shown in FIGURE 2 of the drawings, the bottom of the housing 7 is open. A handle 10 is pivotally secured at 11 on the rear portion of the housing 7. The motor 8 drives a vertical shaft 12 which extends downwardly into the housing 7 and from which the usual grass cutting blade has been removed. Also, the usual supporting wheels have been removed from the housing 7.

The embodiment of the present invention which has been illustrated comprises a pair of spaced, parallel skids, shoes or runners 13 of suitable metal. The runners 13 are provided with upstanding arms or brackets 14 which support the mower 6 in an elevated position on said runners. Bolts 15 secure the arms or brackets 14 to the skirt portion 9 of the housing 7, the usual wheel holes in said skirt portion accommodating said bolts.

Mounted on the runners 13 beneath the housing 7 is an upwardly and rearwardly inclined scoop 16. At its rear end the scoop 16 terminates in an upstanding flange 17 which abuts the rear portion of the housing skirt 9. The longitudinal edges of the scoop 16 are affixed to the arms or brackets 14. Intermediate supports 18 are also provided between the scoop 16 and the runners 13. The runners 13 include upwardly curved open end portions 19 which project beyond the leading edge of the scoop 16.

Figure 3:
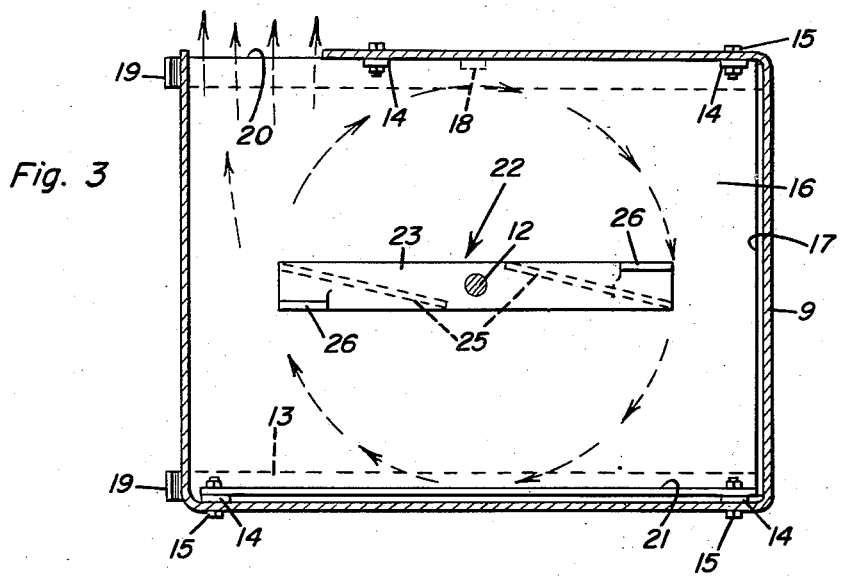
FIGURE 3 is a horizontal sectional view.
Figure 4:
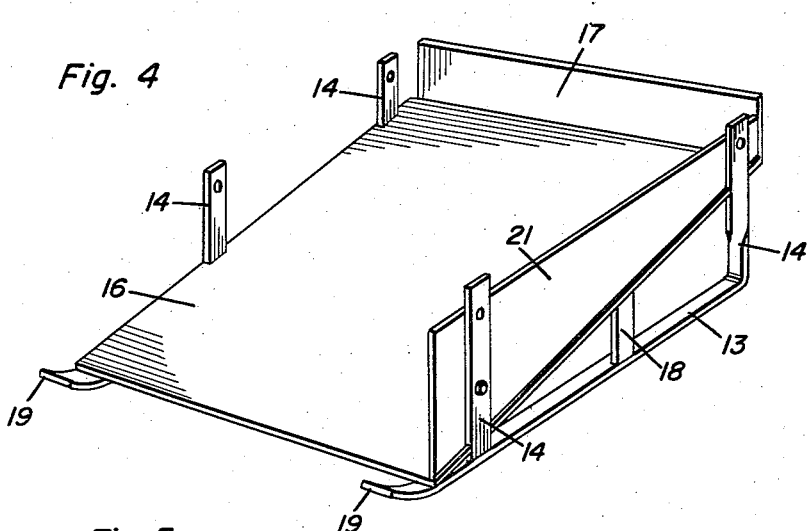
FIGURE 4 is a perspective view of the scoop unit.
Figure 5:
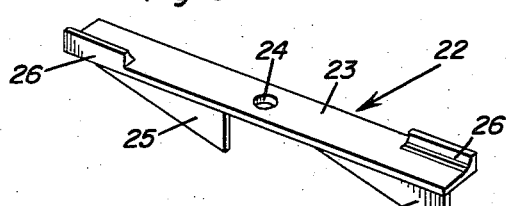
FIGURE 5 is a perspective view of the fan or blower.

As shown to advantage in FIGURE 3 of the drawings, the housing 7 of the mower 6 is provided in the front portion of one side thereof with a discharge opening or port 20. Mounted longitudinally on the side of the scoop 16 which is remote from the discharge port or opening 20 is a wall or baffle 21 which is secured on the adjacent members 14 beneath the housing skirt 9.

Secured on the motor shaft 12 in lieu of the usual grass cutting blade is a fan or blower 22. The blower 22 includes a bar 23 having an opening 24 in an intermediate portion thereof which receives the shaft 12. Mounted diagonally beneath the end portions of the bar 23 are blades 25. Upstanding fins or the like 26 are provided on the end portions of the bar 23 for increasing the efficiency of the blower 22. Means comprising the usual nut 27 secures the blower 22 on the motor shaft 12.

It is thought that the use of the invention will be readily apparent from a consideration of the foregoing. Briefly, the usual grass cutting blade of the mower 6 is removed and the blower 22 is substituted therefor on the motor shaft 12. In the embodiment shown, all of the usual supporting wheels have been removed from the mower and the unit comprising the scoop 16, the runners 13, etc. is mounted beneath the mower, being secured by the bolts 15. With the motor 8 driving the blower 22 the device is then pushed forwardly through the snow which is elevated by the inclined scoop 16. As the snow is thus elevated to the blower 22 said snow is thrown outwardly by centrifugal force through the discharge port or opening 20 in an obvious manner. The wall or baffle 21 prevents the snow from being discharged on the side of the machine which is remote from the opening 20. Of course, the device travels on the runners 13. To reconvert the machine for cutting grass, the foregoing procedure is substantially reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is a follows:

1. A snowplow attachment for rotary power lawn mowers of the type including an open-bottom housing having a discharge port and a vertical power-driven shaft rotatable in said housing, said attachment comprising an upwardly and rearwardly inclined snow elevating scoop mounted beneath and in vertical alignment with the housing, and a blower on the shaft operable in the housing for receiving snow wedged upwardly and axially of said shaft by forward movement of said elevating scoop relative to said snow and discharging said snow through the port, said blower comprising an elongated horizontal bar secured to said shaft at its mid portion and extending transversely of said shaft, a plurality of depending blades carried by opposite end portions of said bar and extending longitudinally of the latter.

2. The combination of claim 1 wherein said blades are inclined relative to the longitudinal axis of said bar.

3. The combination of claim 2 wherein each of said blades is generally rectangular in longitudinal cross-section.

4. The combination of claim 2 wherein said blades are two in number and each is generally triangular in longitudinal cross-section having one side edge secured to the undersurface of said bar, each blade extending substantially along one half of said bar, and the base edge of one of said triangular blades being adjacent one end of said bar and the base edge of the other blade being adjacent said shaft.

5. A snowplow comprising an open-bottom housing having a discharge port, a vertical power-driven shaft rotatable in said housing, an upwardly and rearwardly inclined snow elevating scoop mounted beneath and in vertical alignment with the housing, and a blower on the shaft operable in the housing for receiving snow wedged upwardly and axially of said shaft by forward movement of said elevating scoop relative to said snow and discharging said snow through the port, said blower comprising an elongated horizontal bar secured to said shaft at its mid portion and extending transversely of said shaft, a plurality of depending blades carried by opposite end portions of said bar and extending longitudinally of the latter.

6. The method of converting a conventional vertical shaft rotary power lawn mower for snow removal comprising the steps of removing the grass cutting blade, attaching a blower on the vertical shaft, removing all of the supporting wheels, mounting a pair of spaced, parallel runners on the mower so as to support said mower in an elevated position while maintaining said shaft in its normal vertical position, and securing an upwardly and rearwardly inclined scoop extending between the runners and beneath the blower, said scoop extending upwardly from a lower forward edge positioned at ground level.

References Cited in the file of this patent
UNITED STATES PATENTS

| | | |
|---|---|---|
| 107,485 | Harris | Sept. 20, 1870 |
| 110,446 | Dougherty | Dec. 27, 1870 |
| 1,703,740 | Liddell | Feb. 26, 1929 |
| 2,605,561 | Maynard et al. | Aug. 5, 1952 |
| 2,642,680 | Curtis et al. | June 23, 1953 |
| 2,752,699 | Gustafson | July 3, 1956 |